(12) United States Patent
Giri et al.

(10) Patent No.: US 11,397,612 B2
(45) Date of Patent: Jul. 26, 2022

(54) AUTONOMOUS JOB QUEUEING SYSTEM FOR HARDWARE ACCELERATORS

(71) Applicant: Analog Devices International Unlimited Company, Limerick (IE)

(72) Inventors: Abhijit Giri, Bangalore (IN); Rajib Sarkar, Gobardanga (IN)

(73) Assignee: ANALOG DEVICES INTERNATIONAL UNLIMITED COMPANY, Limerick (IE)

( * ) Notice: Subject to any disclaimer, the term of this patent is extended or adjusted under 35 U.S.C. 154(b) by 325 days.

(21) Appl. No.: 16/661,819

(22) Filed: Oct. 23, 2019

(65) Prior Publication Data

US 2021/0026684 A1 Jan. 28, 2021

(30) Foreign Application Priority Data

Jul. 27, 2019 (IN) .............................. 201941030394

(51) Int. Cl.
| | |
|---|---|
| *G06F 9/48* | (2006.01) |
| *G06F 9/46* | (2006.01) |
| *G06F 9/54* | (2006.01) |
| *G06F 9/50* | (2006.01) |
| *G06F 9/38* | (2018.01) |

(52) U.S. Cl.
CPC .......... *G06F 9/4881* (2013.01); *G06F 9/3851* (2013.01); *G06F 9/463* (2013.01); *G06F 9/5038* (2013.01); *G06F 9/542* (2013.01)

(58) Field of Classification Search
CPC .. G06F 2209/509; G06F 9/3851; G06F 9/463; G06F 9/485; G06F 9/4881; G06F 9/5027; G06F 9/5038; G06F 9/542
See application file for complete search history.

(56) References Cited

U.S. PATENT DOCUMENTS

| | | | |
|---|---|---|---|
| 4,658,351 A * | 4/1987 | Teng | ..................... G06F 9/4881 718/103 |
| 5,522,080 A | 5/1996 | Harney | |
| 5,625,846 A | 4/1997 | Kobayakawa et al. | |
| 5,983,301 A | 11/1999 | Baker et al. | |
| 6,105,127 A * | 8/2000 | Kimura | ................. G06F 9/3822 712/215 |
| 6,434,645 B1 | 8/2002 | Parvin et al. | |
| 6,704,847 B1 | 3/2004 | Six et al. | |
| 6,834,385 B2 | 12/2004 | Bohm et al. | |
| 2003/0208521 A1* | 11/2003 | Brenner | ................ G06F 9/4881 718/103 |

(Continued)

FOREIGN PATENT DOCUMENTS

| | | |
|---|---|---|
| JP | 2004-272894 | 9/2004 |
| JP | 2018-533122 | 8/2018 |

(Continued)

*Primary Examiner* — Jorge A Chu Joy-Davila
(74) *Attorney, Agent, or Firm* — Patent Capital Group

(57) ABSTRACT

Embodiments may relate to an electronic device that includes a processor communicatively coupled with a hardware accelerator. The processor may be configured to identify, based on an indication of a priority level in a task control block (TCB), a location at which the TCB should be inserted in a queue of TCBs. The hardware accelerator may perform jobs related to the queue of TCBs in an order related to the order of TCBs within the queue. Other embodiments may be described or claimed.

20 Claims, 8 Drawing Sheets

(56) References Cited

U.S. PATENT DOCUMENTS

| | | | |
|---|---|---|---|
| 2004/0160446 A1 | 8/2004 | Gosalia et al. | |
| 2005/0226238 A1* | 10/2005 | Hoskote | H04L 69/12 370/389 |
| 2008/0291209 A1* | 11/2008 | Sureka | H04N 19/42 345/531 |
| 2009/0172683 A1* | 7/2009 | Lin | G06F 9/3877 718/103 |
| 2009/0222621 A1* | 9/2009 | Ash | G06F 9/5016 711/E12.001 |
| 2011/0212761 A1* | 9/2011 | Paulsen | G07F 17/3223 463/25 |
| 2012/0036375 A1* | 2/2012 | Puschini Pascual | G06F 9/5027 713/300 |
| 2013/0205122 A1* | 8/2013 | Wang | G06F 9/3879 712/220 |
| 2014/0304491 A1 | 10/2014 | Kasahara et al. | |
| 2016/0132329 A1* | 5/2016 | Gupte | G06F 9/3851 718/103 |
| 2016/0156747 A1* | 6/2016 | Narasimhamurthy | H04L 67/141 709/228 |
| 2017/0075734 A1 | 3/2017 | Raman | |
| 2020/0202482 A1 | 6/2020 | Itagaki et al. | |
| 2020/0327256 A1* | 10/2020 | Fender | G06F 1/3206 |

FOREIGN PATENT DOCUMENTS

| WO | 2013/065687 | 5/2013 |
|---|---|---|
| WO | 2019/044340 | 3/2019 |

\* cited by examiner

AUTONOMOUS JOB QUEUEING SYSTEM FOR HARDWARE ACCELERATORS

CROSS-REFERENCE TO RELATED APPLICATION

This application claims the benefit of Indian Patent Application 201941030394, filed Jul. 27, 2019, the subject matter of which is hereby incorporated by reference in its entirety.

FIELD OF THE DISCLOSURE

This disclosure relates in general to the field of computing and, more particularly, though not exclusively, to a system and method for job queueing in a computing device.

BACKGROUND

Hardware accelerators are ubiquitous in digital signal processors (DSPs) to offload most common DSP routines like finite impulse response (FIR), infinite impulse response (IIR), fast Fourier transforms (FFT), etc. Even though the idea may be to significantly augment compute horsepower, there is often high barrier to their effective use due to the need of the instruction processing core having to set up data flows and track and manage execution. Often such core-driven management requires significant instruction cycles as well. This makes it very difficult to seamlessly integrate them in the data flow through the DSP where core and accelerator must efficiently share the processing load. As a result, accelerators may remain unused except when accelerator can complete a computing task many times faster compared to core-execution time and the overhead combined.

SUMMARY OF THE DISCLOSURE

Figure 1:
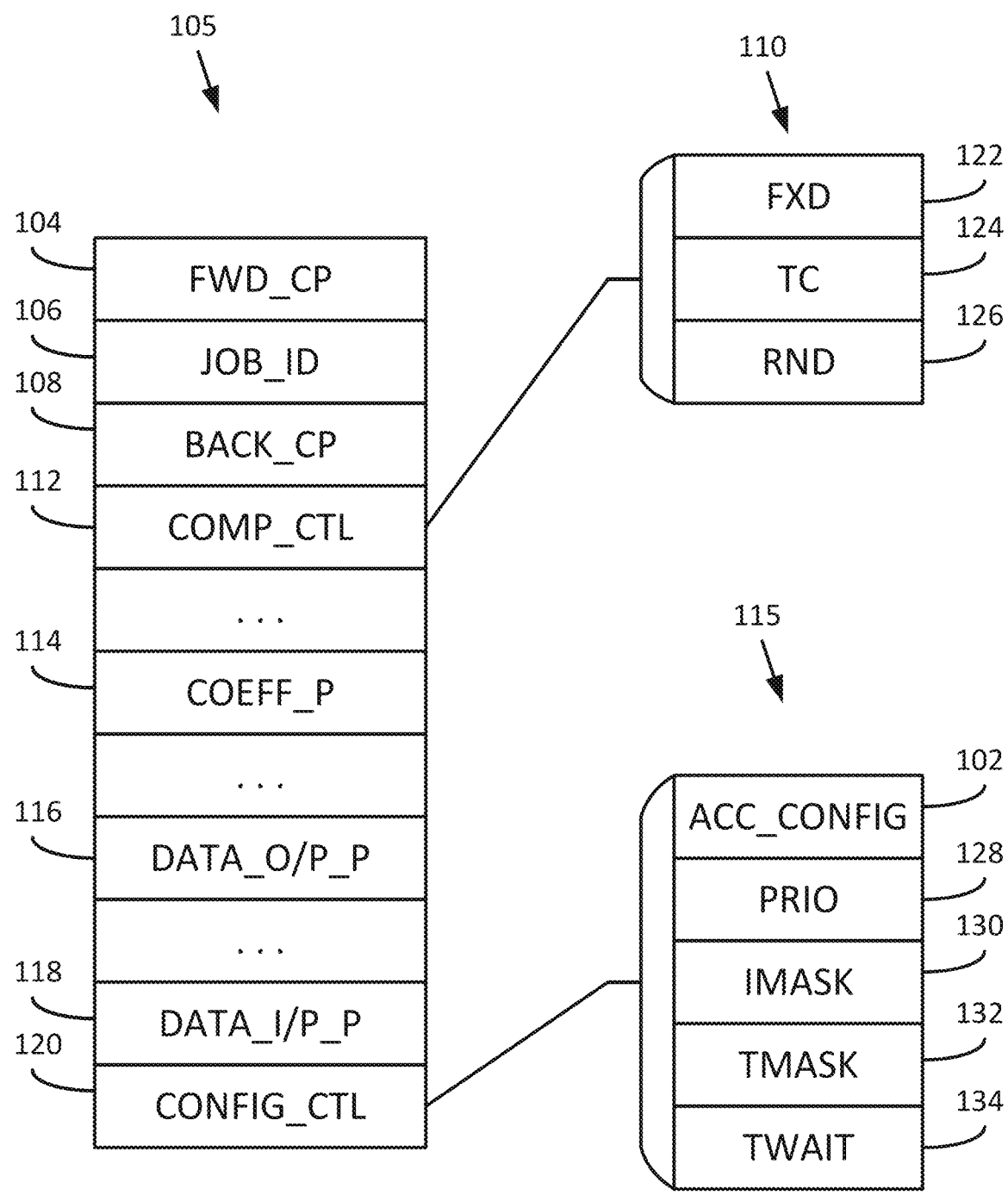
FIG. 1 depicts an example structure of a task control block (TCB), in accordance with various embodiments.

Embodiments may relate to an electronic device that includes a processor communicatively coupled with a hardware accelerator. The processor may be configured to identify, based on an indication of a priority level in a TCB, a location at which the TCB should be inserted in a queue of TCBs. The hardware accelerator may perform jobs related to the queue of TCBs in an order related to the order of TCBs within the queue.

One embodiment may relate to a computing device comprising: a processor to: identify, in a TCB, an indication of a priority level of the TCB; identify, based on the indication of the priority level, a location in a queue of a plurality of TCBs; and insert the TCB in the queue at the identified location; and a hardware accelerator communicatively coupled with the processor, wherein the hardware accelerator is to perform jobs related to TCBs in the queue of the plurality of TCBs, wherein the hardware accelerator is to perform a job related to a TCB in accordance with an order of the TCB in the queue of the plurality of TCBs.

Another embodiment may relate to a processor comprising: a communications interface to communicate with a hardware accelerator; and logic coupled with the communications interface, wherein the logic is to: identify, in a TCB, an indication of a priority level of the TCB; and insert, based on the indication of the priority level, a the TCB at a location in a queue of a plurality of TCBs; wherein the hardware accelerator is to execute respective ones of the plurality of TCBs based on their location within the queue.

Another embodiment may relate to one or more non-transitory computer-readable media comprising instructions that, when executed by an electronic device, are to cause a processor of the electronic device to: identify a queue of a plurality of TCBs, wherein respective TCBs of the plurality of TCBs include an indication of a priority level of the respective TCBs within the queue, and a hardware accelerator is to perform a job related to a respective TCB in accordance with the priority level of the TCB; execute an application programming interface (API) related to the queue; and modify the queue based on execution of the API.

DETAILED DESCRIPTION

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or elements are in direct contact. In some embodiments, "coupled" may refer to two elements being physically placed in the close vicinity of one another and having an exclusive and very fast access therebetween.

Various operations may be described as multiple discrete operations in turn, in a manner that is most helpful in understanding the claimed subject matter. However, the order of description should not be construed as to imply that these operations are necessarily order dependent.

As used herein, the term "module" may refer to, be part of, or include an application-specific integrated circuit (ASIC), an electronic circuit, a processor (shared, dedicated, or group) or memory (shared, dedicated, or group) that execute one or more software or firmware programs, a combinational logic circuit, or other suitable components that provide the described functionality.

As noted above, hardware accelerators may go unused for a variety of reasons. However, a management system through which the core may efficiently offload certain DSP tasks to a dedicated hardware accelerator, and subsequently be notified by the hardware accelerator upon completion of the task, may be useful. The practicality of such a system may increase if the management system allows the core to submit tasks in a pool without waiting for completion of the current job.

Embodiments herein may provide a variety of advantages. For example, a hardware accelerator governed by such a management system may allow for a processor or processor core to efficiently offload one or more DSP tasks to the hardware accelerator. Additionally, a hardware-based queueing system for the accelerator may be beneficial over, for example, a software-based management system because a fully software-based management system may be compute or memory intensive because the processor must manage the task pool and assign the accelerator to the next task as the current task finishes.

Generally, embodiments herein relate to a hardware-based autonomous job queue management structure. Embodiments may include a number of elements which may be used to implement the management structure. One such element may relate to a chained DMA infrastructure which may be used to manage the hardware accelerator. Another such element may relate to new job submission within the management structure. Specifically, new job submission may be performed by creating a new entry in the DMA chain. The DMA chain may be, for example, a linked list of TCBs. Generally, a TCB may be considered to be an element that is related to a specific job that is to be executed by the hardware accelerator. Each TCB may include one or more data elements or sub-fields which may include specific configuration data for use by the hardware accelerator in performance of the job. It will be understood that although TCB is referred to herein as a "task control block," in other embodiments the TCB may be referred to by another name such as a "transfer control block."

Various of the TCBs, or fields thereof, may be modified to include information which may be used to aid the queueing mechanism. For example, a TCB may include a pointer to an input (I/P) buffer. The TCB may also include a pointer to an output (O/P) buffer. The TCB may also include a pointer to a "previous" or "next" descriptor which may reference a preceding or subsequent TCB in the DMA chain. The TCB may also include a placeholder which may be used to store a system address related to that TCB. The TCB may also include a job-specific computation configuration of the hardware accelerator. The TCB may also include, repurpose, or reuse a placeholder to store completion status.

In some embodiments, one or more APIs may be used to perform queue management tasks such as creation or submission of new jobs, identifying the status of an existing job, deletion of jobs, etc. The APIs may accomplish these tasks by traversing the linked list of TCBs (for example by using information related to identification of a last job or TCB of a given priority group), reading or modifying various of the TCBs, or fields thereof, introducing or removing entries from the linked list, etc.

Jobs may then get executed in the order that they appear in the linked list of TCBs. Generally, the linked list of TCBs may have separate sections based on the different priorities of the submitted jobs. As a high-level example, a high-priority section of TCBs may be at the top of the linked list of TCBs, and the jobs related to those TCBs may get executed first. A medium-priority section of TCBs may follow the high-priority section of TCBs. The jobs related to those medium-priority TCBs may be executed after the execution of the jobs related to the high-priority TCBs. If a new job with a high-priority flag is received, it may get inserted at the end of the high-priority section of the linked list of TCBs. If the high-priority section of the linked list is finished, then the high-priority TCB may be inserted immediately after the currently running job related to the TCB in the medium-priority section.

FIG. 1 depicts an example TCB 105 which may be provided to a hardware accelerator for execution. As can be seen, the TCB 105 may include a number of fields. In some embodiments, the various fields of the TCB 105 may be referred to as "words," and the TCB 105 may include up to 16 fields.

Another such field may be the chain pointer 104 which may be referred to as, for example "FWD_CP" to indicate that it is a forward chain pointer. The chain pointer 104 may include an address of a subsequent TCB in the linked list of TCBs. After the hardware accelerator completes the job related to the TCB 105, the hardware accelerator may read the address in the chain pointer 104 and move to next TCB identified by the chain pointer 104. In some embodiments, the identifier of the subsequent job may be a "TCBSYS_ADDR" identifier which may be a system address of the subsequent TCB.

Another such field may be the JOB_ID field 106. Generally, The JOB_ID field 106 may be a placeholder which may be used to store identification information regarding the TCB 105 or the job with which the TCB 105 is associated. Each job described by the TCB is uniquely identified by the value of field 106. Such information may be used by the processor or the hardware accelerator to, for example, identify a status of the job related to the TCB 105. The identification information may be or include, for example, the TCBSYS_ADDR identifier.

Another such field may be the BACK_CP field 108. The BACK_CP field 108 may store an identifier of a previous TCB in the linked list of TCBs, and so may be referred to as a backwards chain pointer. The identifier of the previous TCB may be, for example, the identifier described above with respect to the JOB_ID filed 106. If each TCB in the linked list includes a BACK_CP field 108 that identifies a previous job, and a chain pointer that identifies a subsequent job, then the respective TCBs may form the linked list by pointing to the previous or subsequent TCB. These fields may, in combination, be used by the APIs to traverse the linked list of TCBs which can be useful for priority-based modification of the linked list as will be described in further detail below.

Another such field may be the COMP_CTL field 112. The COMP_CTL field 112 may include a number of sub-fields 110 which may support a job-specific computation configuration. Although the term "sub-fields" is used herein, in other embodiments the sub-field may be referred to as a "flag" or a "data element."

One such sub-field may be the FXD sub-field 122. The FXD sub-field 122 may indicate whether the job should use fixed-point computation or floating-point computation, some other type of computation. The options available may depend on, for example, how many bits are used for the FXD sub-field 122. Another such sub-field may be the TC sub-field 124. The TC sub-field 124 may be used to indicate to the accelerator the type of data it is to operate on or the type of computation that is to be used by the hardware accelerator during execution of the job. Another such sub-field may be the RND sub-field 126 which may indicate a rounding mode that is to be used during completion of the job associated with the TCB 105.

Another field of the TCB 105 may be a COEFF_P field 114. The COEFF_P field 114 may include a reference to the table of coefficients which may be used by the hardware accelerator during performance of the job associated with the TCB 105. For example, in some embodiments there may be multiple datawords associated with the COEFF_P field 114. The datawords may specify how the coefficient table may be laid out in system memory.

Another field of the TCB 105 may be the DATA_I/P_P field 116. The DATA_O/P_P field 116 may be or include a pointer to an O/P buffer. The O/P buffer may be, for example, a buffer of the hardware accelerator or a buffer of an electronic device of which the hardware accelerator is a part or to which the hardware accelerator is communicatively coupled. The O/P buffer may be where the hardware accelerator is to store data related to performance or completion of the job with which the TCB 105 is associated.

Another field of the TCB 105 may be the DATA_I/P_P field 118. The DATA_I/P_P field 118 may include a pointer to an I/P buffer. The I/P buffer may be, for example, a buffer of the hardware accelerator or a buffer of an electronic device of which the hardware accelerator is a part or to which the hardware accelerator is communicatively coupled. The I/P buffer may be where the hardware accelerator is to receive data related to performance of the job with which the TCB 105 is associated.

Another such field of the TCB 105 may include the CONFIG_CTL field 120. The CONFIG_CTL field 120 may include additional sub-fields 115 which may be used to implement the priority-based hardware acceleration scheme described herein. One such sub-field may include the ACC_CONFIG sub-field 102. The ACC_CONFIG sub-field 102 may include information related to techniques that may be used by the hardware accelerator to perform the job related to the TCB. For example, the ACC_CONFIG sub-field 102 may direct the hardware accelerator to implement a finite impulse filter (FIR); a biquadratic infinite impulse filter (IIR) of a specific order; a specific time window related to job performance, wherein the window length may be related to the number of output samples that are to be produced; or a sample rate conversion which may be used. It will, however, be understood that these are examples of what the ACC_CONFIG sub-field 102 may include and other embodiments may include additional or fewer elements.

Another such sub-field may include the PRIO sub-field 128. The PRIO sub-field 128 may include a number of bits which may indicate a priority level of the TCB 105 within the linked list of TCBs. For example, the PRIO sub-field 128 may be a 1-bit indicator which may indicate whether the TCB 105 is at a "high" or "low" priority. Alternatively, the PRIO sub-field 128 may be a 2-bit indicator which may indicate whether the TCB 105 is at a "very high," "high," "medium," or "low" priority.

Another such sub-field may include the IMASK sub-field 130. The IMASK sub-field 130 may indicate whether an interrupt is to be sent to the processor at completion of the job with which the TCB 105 is associated. Generally, it may not be desirable to send an interrupt to the processor at the completion of each job, so this sub-field may serve as a flag to indicate whether an interrupt is desired.

Another such sub-field may include the TMASK sub-field 132. Similarly to the IMASK sub-field 130, the TMASK sub-field 132 may indicate whether a trigger is to be sent to the processor subsystem at completion of the job with which the TCB 105 is associated. Generally, it may not be desirable to send a trigger to the processor subsystem at the completion of each job, so this sub-field may serve as a flag to indicate whether a trigger is desired.

Another such sub-field may include the TWAIT sub-field 134. Generally, before the processor can submit a new TCB to the job pool by way of addition to the linked list, both a data buffer containing one or more coefficients (location of which may be indicated by the COEFF_P field 114) and input data buffer (which may be the data in the I/P buffer indicated by the DATA_I/P_P field 118) may be needed. Generally, the coefficient may be static, but the input data may be dynamic. If the input data is not available, the hardware accelerator may process old or corrupted data during performance of the job indicated by the TCB 105. If the TWAIT sub-field is set for the TCB 105 then, when the hardware accelerator is executing the job related to that TCB, the hardware accelerator may wait for an indication of I/P buffer completion in the form of a trigger received from any of the components of the processor subsystem such as a DMA which may be responsible for preparing the buffer. Once the trigger is received from the processor, the hardware accelerator may start the input DMA to transfer data to its internal buffer so that it may execute the relevant job. As a result, a TCB may be submitted by the processor to the linked list even if the corresponding input data is not available in the I/P buffer at the time of submission by the processor.

Generally, it will be understood that the TCB 105 and the relevant fields/sub-fields/etc. are depicted and discussed herein as examples of such fields/sub-fields, and other embodiments may vary from those depicted. For example, some TCBs may have additional or fewer fields than depicted. In some embodiments, the described fields may differ from the exact parameters described. As a specific example, in some embodiments the PRIO sub-field 128 may include more or fewer bits than the 1-bit or 2-bit arrangements described. Additionally, it will be recognized that the specific names given in this example are names that could be used in one embodiment, but other names may be used for the specific fields or sub-fields in other embodiments while still performing the described functionality. Other variations may be present in other embodiments.

Figure 2:
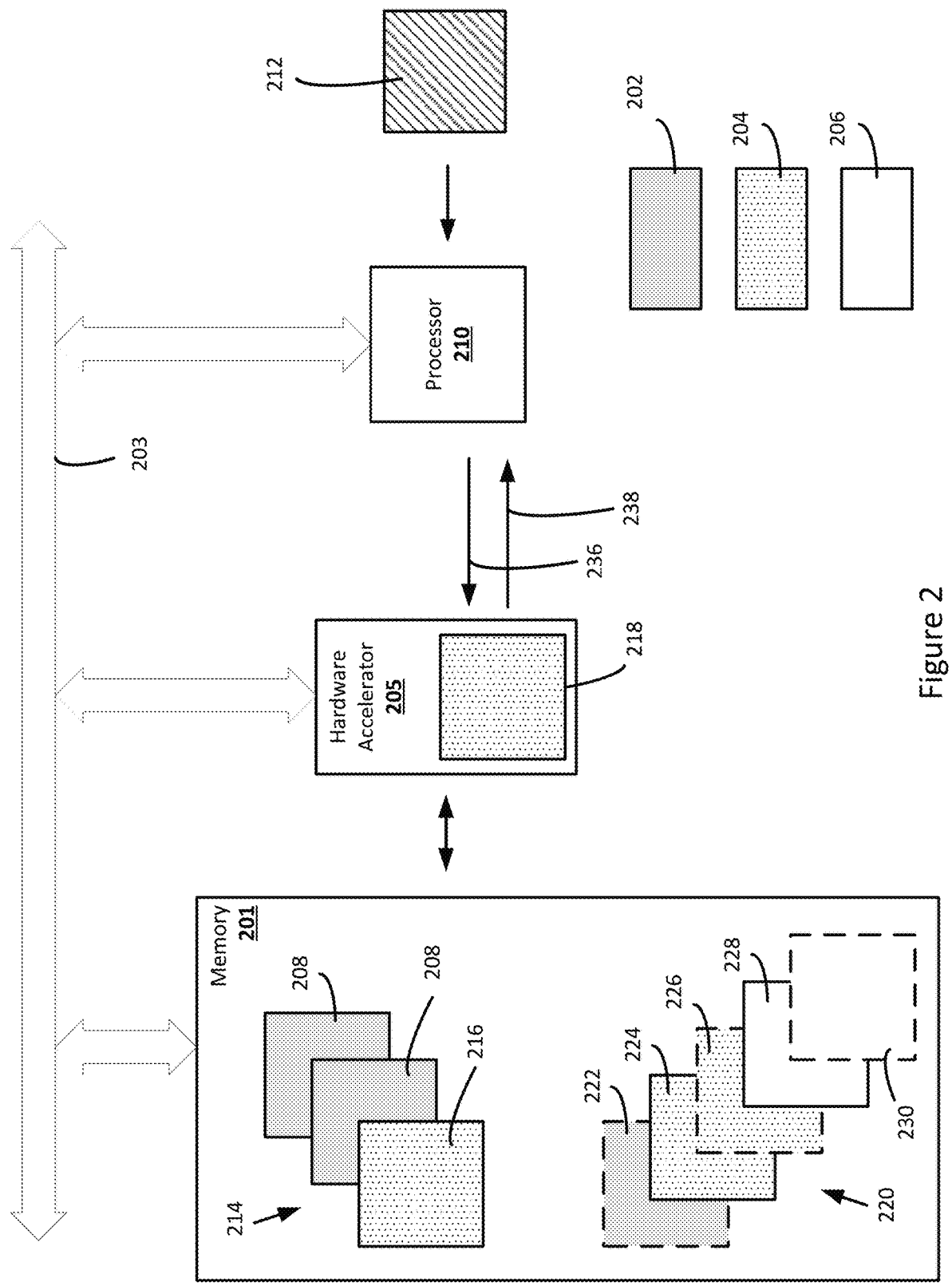
FIG. 2 depicts an example of job queueing, in accordance with various embodiments.

FIG. 2 depicts a high-level example of job queueing, in accordance with various embodiments. Specifically, FIG. 2 depicts a high-level example of queueing of a newly-introduced TCB into a linked list of TCBs. Each of the discussed TCBs may have a priority level such as that discussed with respect to the PRIO sub-field 128. In this particular example, there are three different priority levels which are graphically depicted in FIG. 2 based on different shading. The three different priority levels are a high priority 202, a medium priority 204, and a low priority 206. Generally, TCBs with the high priority levels are to be executed prior to execution of TCBs with a medium or low priority levels. Similarly, TCBs with the medium priority levels are to be executed prior to execution of TCBs with the low priority levels.

The system may include a processor 210 that is communicatively coupled with a hardware accelerator 205 by a system bus 203. The system bus 203 may be a communicative coupling which allows one or more elements of an electronic device to send or receive data signals to or from one another. The processor 210 may be, for example, a central processing unit (CPU), a multi or single-core processor, a core of a multi-core processor, or some other type of processor. Similarly, the hardware accelerator 205 may be a processing unit such as a hardware logic block configured to perform certain function or a set of functions, a CPU, a multi or single-core processor, a core of a multi-core processor, or some other type of processor. The processor 210 may further include logic to execute one or more computer-executable instructions, logic to perform one or more mathematical processes or computations, etc.

The system may further include a memory 201. The memory 201 may be a volatile or nonvolatile memory such as double data rate (DDR) memory, flash memory, random-access memory (RAM) or some other type of memory. More specifically, the memory 201 may include one or more buffers such as the I/P buffers, O/P buffers, or COEFF buffers discussed above. Additionally, the memory 201 may be configured to store one or more TCBs in the linked list of TCBs, in accordance with various embodiments described herein. The memory 201 may be communicatively coupled with the processor 210 and the hardware accelerator 205 by the system bus 203.

One or more of the processor 210, the memory 201, and the hardware accelerator 205 may be configured as a system on chip (SoC), a system in package (SiP), or some other configuration. In some embodiments two or more of the processor 210, the memory 201, and the hardware accelerator 205 may be elements of the same substrate, e.g., elements of an interposer or a printed circuit board (PCB) while in other embodiments each of the processor 210, the memory 201, and the hardware accelerator 205 may be on different substrates. In some embodiments two or more of the memory 201, the processor 210, and the hardware accelerator 205 may be logical or physical subdivisions within in a single semiconductor or a single chip, whereas in other embodiments each of the memory 201, the processor 210, and the hardware accelerator 205 may be physically separated from one another.

The hardware accelerator 205 may be configured to execute jobs related to a number of TCBs in a linked list of TCBs that are stored in the memory 201. Respective TCBs of the linked list of TCBs may be similar to, for example, TCB 105. The linked list of TCBs is depicted in FIG. 2 as including previously-executed TCBs 214, a currently-executing TCB 218, and TCBs that are to be executed 220.

A TCB 212 may be identified or generated by the processor 210. The processor 210 may identify that the TCB is to be inserted into the linked list of TCBs. Provision of the TCB 212 to the hardware accelerator 205 may then include a number of messages to be exchanged between the processor and the hardware accelerator 205. Specifically, if the hardware accelerator 205 is currently executing a job related to a TCB in the queue, then it may not be desirable to add a TCB to the queue, since modification of TCBs both by the processor 210 and the hardware accelerator 205 may give rise to consistency issues. The processor 210 may send a halt command at 236 to the hardware accelerator 205. The halt command may include, for example, writing a bit to a register of the hardware accelerator 205. The halt command at 236 may indicate to the hardware accelerator 205 that the hardware accelerator 205 is to pause processing as soon as it is practical. In some embodiments, halting may need a number of cycles in the event, for example, the hardware accelerator 205 may have initiated a memory access operation and is subsequently awaiting the completion of the memory access operation. In response to the halt command at 236, the hardware accelerator 205 may send a halt-acknowledgement at 238. The halt-acknowledgement at 238 may indicate that the hardware accelerator 205 has halted operation and is awaiting further instructions from the processor 210. The processor 210 may then insert the TCB 212 into the queue of TCBs in the memory 201. Placing a TCB in the queue at a specified place with respect to the other TCBs, may include, for example, modifying the FWD_CP 104 and BACK_CP 106 fields of one or more of the TCBs in the linked list of TCBs.

Turning to the queue of TCBs, it can be seen that there are a number of previously-executed TCBs 214. The previously-executed TCBs 214 may include two high-priority TCBs 208 (i.e., TCBs with a PRIO sub-field that indicates it is to be executed in accordance with the "high" priority). The previously-executed TCBs 214 may also include a mid-priority TCB 216 (i.e., a TCB with a PRIO sub-field that indicates it is to be executed in accordance with the "medium" priority after high-priority TCBs). Further, the hardware accelerator 205 may be executing a job related to another medium-priority TCB 218. The TCBs that are to be executed 220 may include a medium-priority TCB 224 and a low-priority TCB 228 (i.e., a TCB with a PRIO sub-field that indicates it is to be executed in accordance with the "low" priority after high-priority and medium-priority TCBs).

The TCBs with the dashed outline indicate different locations where the TCB 212 may be placed in the queue in accordance with its priority. As noted, it is not possible to stop a job related to a currently-executing TCB. Therefore, if the TCB 212 is a high-priority TCB, then it would be placed at the location indicated by TCB 222. As such, it would be placed in the queue so that it would processed and any jobs related to it would be executed prior to the execution of any other jobs related to medium-priority TCBs like TCB 224. In other words, because the currently-executing TCB 218 is a medium-priority TCB, the high-priority TCB 212 would be next in the queue.

If, however, the TCB 212 is a medium-priority TCB, then it would be placed at the location in the queue indicated by TCB 226. This location would be at the end of the medium-priority TCBs but prior to any low-priority TCBs. Finally, if the TCB 212 is a low-priority TCB, then it would be placed at the location in the queue indicated by TCB 230. This location would be at the end of the low-priority TCBs.

The following table, Table 1, provides various examples of how priority-based task insertion may be accomplished in an embodiment with three priority levels (high, medium, and low). However, it will be understood that this table is intended as a high-level example and other embodiments may include variations of this table.

TABLE 1

| Priority Level of Currently-Executing TCB 218 | Priority Level of TCB That is to Be Inserted, TCB 212 | Insertion Location |
|---|---|---|
| High | High | Insert TCB 212 after last TCB with high priority level |
| High | Medium | Insert TCB 212 after last TCB with medium priority level |
| High | Low | Insert TCB 212 after last TCB with low priority level |
| Medium | High | Insert TCB 212 immediately after TCB 218 |
| Medium | Medium | Insert TCB 212 after last TCB with medium priority level |
| Medium | Low | Insert TCB 212 after last TCB with low priority level |
| Low | High | Insert TCB 212 immediately after TCB 218 |
| Low | Medium | Insert TCB 212 immediately after TCB 218 |
| Low | Low | Insert TCB 212 after last TCB with low priority level |

It will be understood that this example FIG. 2 is intended as one simplified example of priority-based queue management, and other embodiments may vary from the depicted example. For example, some embodiments may have more or fewer priority levels than discussed or depicted in FIG. 2. The number of priority levels may be dependent on the PRIO sub-field 128 discussed above. Additionally, the number of TCBs at various priority levels may be different in different use-cases.

Additionally, the use-case of FIG. 2 is described as introducing a TCB 212 to the queue. However, it will be understood that other modifications of the queue may be possible. Such modifications may include the deletion of TCBs from the queue, querying the status of a job related to a TCB of the queue, modifying a TCB in the queue, etc. Generally, management of the queue may be performed based on various APIs that may be used by the processor 210 to manage the queue. FIGS. 3-7 depict various APIs which may be used for queue management. Such queue management by the processor 210 may include one or more of the following: creation of a "job" (e.g., positioning a TCB in the memory), submission of the job to the queue, insertion of the job at an indicated place in the queue with respect to other existing TCBs, deletion of the job from the queue, determination of the completion status of a job, etc. To perform these management tasks, the processor 210 may need to store certain queue related information such as the memory reference of the first TCB in the queue, first TCB in the queue at a given priority level, last TCB in the queue, last TCB in the queue at a given priority level, or some combination thereof, and be able to traverse the linked list of the TCBs with the help of the two chain pointer fields in each TCB (e.g., the chain pointer field 104 and the BACK_CP field 108).

Figure 3:
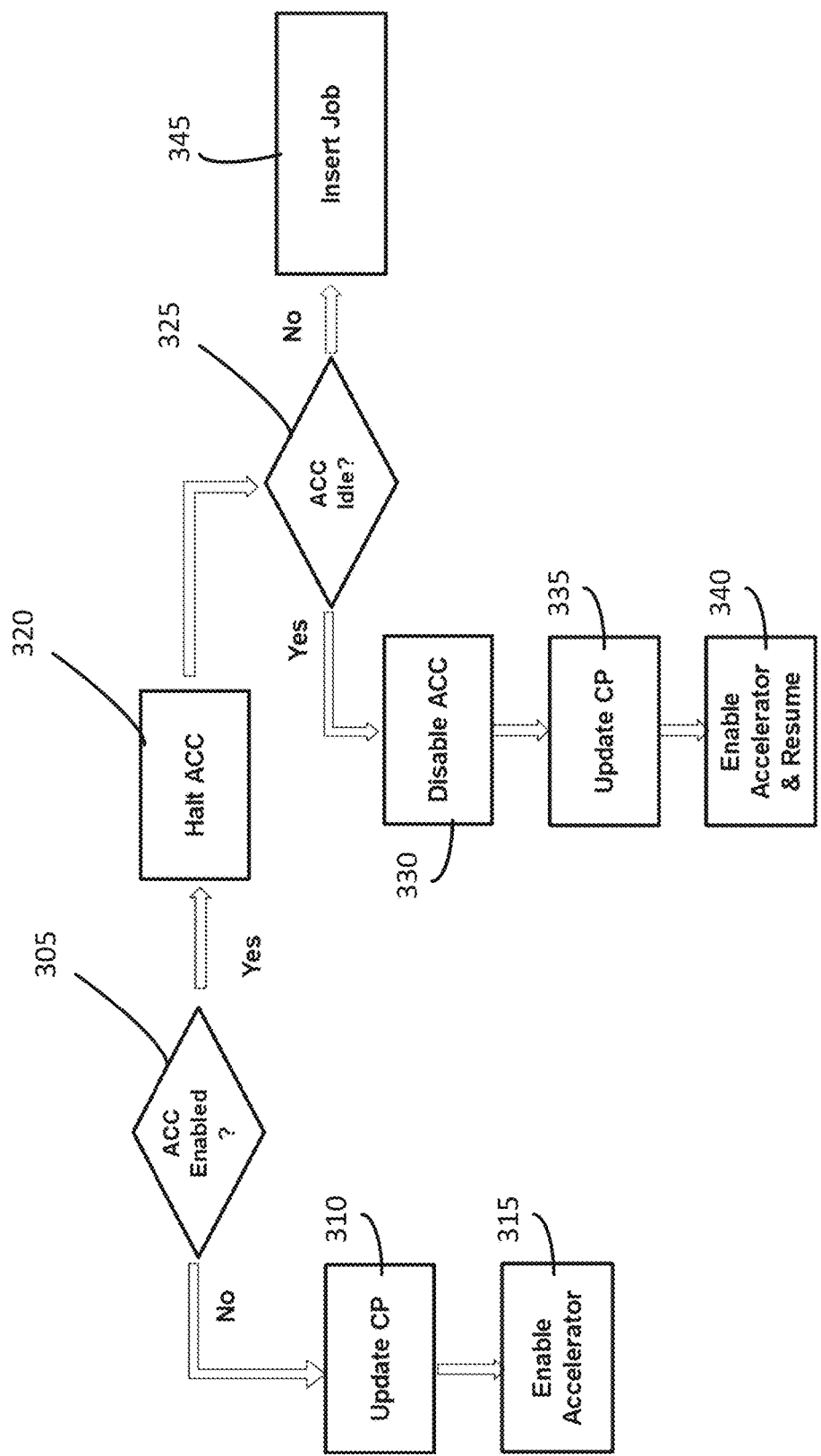
FIG. 3 depicts an example application programming interface (API) which may be used to perform job queueing in a hardware accelerator, in accordance with various embodiments.

Generally, FIG. 3 describes an API that may be used to submit a job to the queue. The API of FIG. 3 may be performed by, for example, the processor 210. The syntax of a submission command related to the API may be: submit_job(ACC_TCB TCB_x, ACC_TCB TCB_n). "ACC_TCB TCB_x" may include information that refers to a TCB that is to be inserted into the queue. The TCB may be referred to as "TCB_x." The information may be a pointer that refers to TCB_x or it may be all or a portion of the TCB.

Similarly, "ACC_TCB TCB_n" may include information that refers to a TCB in the queue following which the TCB_x is to be placed in the queue. The information may be a pointer that refers to TCB_n or it may be all or a portion of the TCB.

Initially, the API may include checking, at 305, whether the hardware accelerator (e.g., hardware accelerator 205) is enabled. As used herein, "enabled" may refer to whether the hardware accelerator is configured to accept TCB s/perform jobs related to the TCBs. If the hardware accelerator is not enabled, then the processor may provide the hardware accelerator 205 with an indication of the first TCB that is to be processed in the linked list of TCBs. Specifically, the processor may update a chain pointer register CP within the hardware accelerator with the address of the first TCB in the queue. The hardware accelerator may then be enabled at 315 so that it will process the TCB and perform the job with which the TCB is associated. In some embodiments, the TCB-submission API depicted at 305 may then be re-started.

If, however, the hardware accelerator is identified at 305 to be enabled, then it may be desirable for the processor to halt the hardware accelerator at 320. Halting the hardware accelerator may include, for example, sending the halt message discussed with respect to element 236 of FIG. 2. The processor may wait for the confirmation that the accelerator has halted by monitoring the for the halt-acknowledgement described above with respect to element 238. The processor may then determine, at 325, whether the hardware accelerator is idle. As used herein, "idle" may refer to whether the hardware accelerator has finished processing all TCBs in an existing queue of TCBs. If the hardware accelerator is determined at 325 to be idle at 325, then the hardware accelerator may be disabled at 330 by the processor writing to one or more bit-field in the configuration registers within the hardware accelerator. This disablement may serve as a "reset" of the hardware accelerator. The chain pointer register CP within the hardware accelerator may be updated with the address of the TCB at 335 by the processor, and then the hardware accelerator may be re-enabled at 340. Re-enablement of the hardware accelerator may include, for example, changing the bit in the register which indicates that the hardware accelerator should halt as described above with respect to element 236. Once the hardware accelerator is re-enabled at 340, the hardware accelerator may resume its functions and, additionally, the processor may resume executing application code related to an API as described herein, some other API, or some other processing function.

Figure 4:
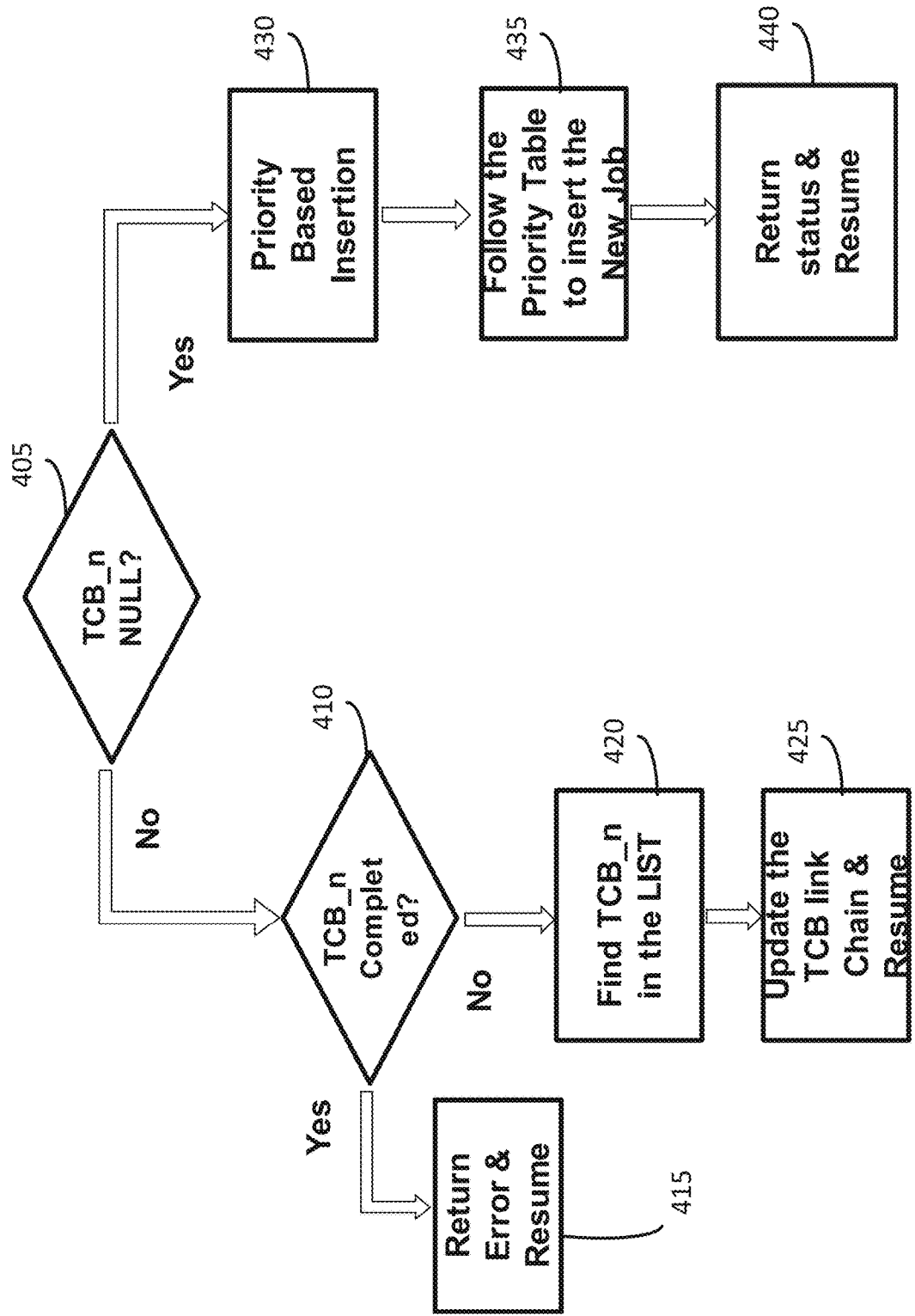
FIG. 4 depicts another example API which may be used to perform TCB job queueing, in accordance with various embodiments.

If, however, the hardware accelerator is determined at 325 to not be idle, then the processor may perform an API related to insertion of the TCB into the queue of TCBs at 345. The syntax of the insertion command related to the API may be: insert_job(ACC_TCB TCB_x, ACC_TCB TCB_n). "ACC_TCB TCB_x" and "ACC_TCB TCB_n" may be similar to those described above with respect to FIG. 3. FIG. 4 depicts an example of the insertion API. It will be understood that in other embodiments the insert_job API may be performed separately from the API of FIG. 3.

Initially, the API may include identifying, at 405, whether the pointer to TCB_n in the insert_job API is a NULL (0) value. If TCB_n is not a NULL value, the API may then include identifying, at 410, whether TCB_n has been completed. More specifically, the API may include identifying, at 410, whether the job related to TCB_n has been completed or whether TCB_n is in the list of previously-executed TCBs described at 214. If it is, then the hardware accelerator may provide an error indication at 415 to the processor. The error indication may be due to the fact that a TCB inserted after a TCB whose processing is completed will not be accessed by the hardware accelerator, and as such the associated job may never be executed. The hardware accelerator or the processor may resume operation as described above.

However, if the TCB_n is not identified at 410 as completed, then the processor may find, at 420, TCB_n in the list of TCBs. Specifically, the processor may query one or more of the TCBs in the list of TCBs until TCB_n is identified. The processor may then update, at 425, the TCB link chain. Updating the link chain may include, for example, updating the chain pointer of the TCB that is to be inserted, updating the chain pointers of one or more TCBs in the chain, updating a buffer of the hardware accelerator, updating the processor, etc. The updates may be for the purpose correctly identifying the TCB_n. The processor and hardware accelerator may then resume operation as described above.

If the pointer to TCB_n value in the API is a NULL value at 405, this may indicate that TBC_x is to be inserted in to the queue based on its priority as indicated in PRIO field 128 of the TCB structure 105. As a result, the processor may then perform priority-based insertion of the TCB at 430. The priority-based insertion may include using information about a first or last TCB in a given priority section, or a queue in general, to identify a location at which the TCB should be inserted. As one example, the priority-based insertion may include traversing, at 435, a priority table to insert the new job or the new TCB into the list of TCBs. For example, the processor may have, or may have access to, a table related to the list of TCBs that indicates a priority level for each TCB, or an indication of a first or last TCB of a given priority section. In some embodiments the processor may have, or may have access to, indicators or flags which indicate a last TCB at a given priority level. These flags or indicators may help reduce the amount of time that the system or the hardware accelerator is halted while TCB management is being performed. Alternatively, the processor 210 may traverse the chain of the TCBs in memory 201 in FIG. 2, starting from the first TCB in the queue, the currently-executing TCB, or some other TCB with the help of the chain pointer fields 104 or 108 of the TCB. The traversal may be, for example, to identify a last TCB in a given priority section. It may determine the priority level of each TCB by reading the PRIO field 128 of the TCB. It will be understood that although a priority table is described herein, in other embodiments the data structure related to the priority-based organization of the TCBs may be different.

The API may then return and resume at 440. Generally, APIs may be called by a higher-level application executing on the processor. When an API returns, the processor may "resume" executing the remaining portion of the application code. The hardware accelerator may also resume its function form the "halted" state as described above.

The processor 210 may traverse the linked list (e.g., by using information about a last TCB of a given priority section or by some other technique) to identify a location at which the TCB_x should be placed as described above with respect to FIG. 2. Once the location is identified, the TCB may be inserted into the list of TCBs. The API may then indicate that the TCB was successfully inserted into the list of TCBs, for example by returning a SUCCESS indicator to higher-level application which may have required or caused the TCB and resume executing other functions of the higher-level application.

Figure 5:
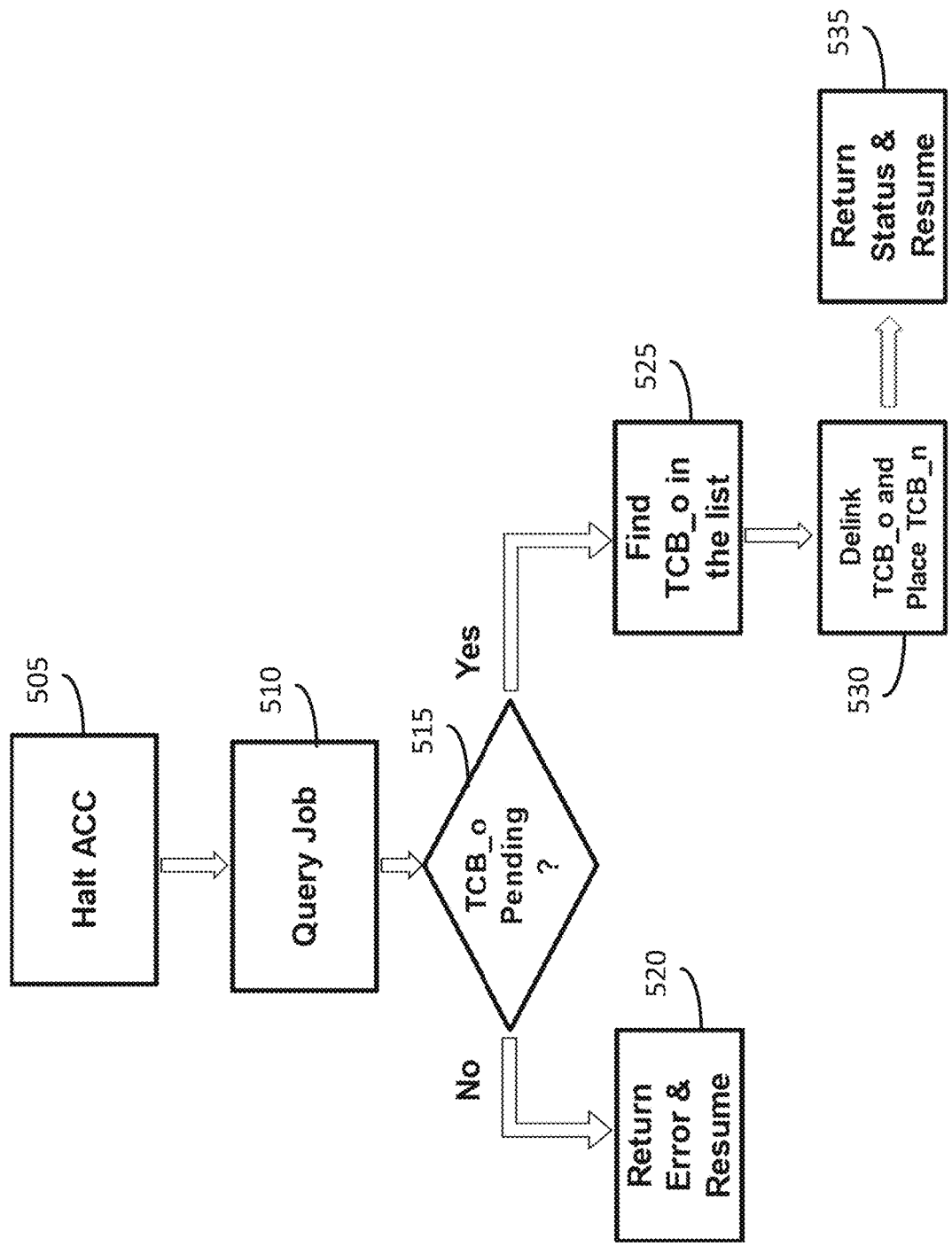
FIG. 5 depicts another example API which may be used to perform TCB job queueing, in accordance with various embodiments.

In some embodiments, it may be desirable to modify an existing job or TCB. The modification might include, for example, replacing an existing TCB in the list of TCBs with another TCB that includes different coefficients, a pointer to a different input buffer, etc. FIG. 5 depicts an example API that may be used for a job or TCB-modification command. The API may be performed by the processor. The syntax of the modification command related to the API may be: modify_job(ACC_TCB TCB_n, ACC_TCB TCB_o). "ACC_TCB TCB_n" may include information that refers to a new TCB ("TCB_n") that is to be inserted into the queue. "ACC_TCB TCB_o" may include information that refers to a TCB ("TCB_o") that is to be removed from the queue. Specifically, TCB_n may be a TCB that is to be inserted into the queue in place of TCB_o. In this way, an existing TCB (TCB_o) may be modified by replacing that TCB with a new TCB (TCB_n) that includes updated information.

The API may include halting, at 505, the hardware accelerator. The halting may be in response to a halt command such as the halt command described above with respect to element 236. The API may then include querying, at 510, the status of a given job. Specifically, the processor 210 may identify at 510 whether a job pending, completed, running, etc. In some embodiments, the query at 510 may involve running a query API, which is discussed in further detail below with respect to FIG. 7.

The API may then include determining, at 515, whether the result of the query at 510 indicates that TCB_o is pending. A "pending" TCB may refer to a TCB that is in the queue for future execution/processing, and as such a job related to that TCB is not currently being performed by the hardware accelerator or has not already been performed. In other words, a pending TCB may be in the queue of TCBs that are to be executed at 220 as described with respect to FIG. 2. If the TCB_o is not pending, then the API may return an error at 520. The error condition may be because if TCB_o is not pending, then it may not be possible to modify or replace the job related to TCB_o by replacement with TCB_n because that job may have already been performed. After the error condition is identified and returned, operation of the hardware accelerator may resume by, for example, processing the next TCB in the TCB queue.

However, if the query at 510 returns at 515 that TCB_o is pending, then the API may include finding, at 525, TCB_o in the list of pending TCBs. For example, the processor 210 may identify the location or address of TCB_o in the TCBs that are to be executed 220. Once TCB_o is found, the processor 210 may delink TCB_o and place TCB_n in its place at 530. Such a delinking operation may include, for example, altering the chain pointer FWD_CP field of the TCB preceding TCB_o in the queue, and updating this field with the memory address of TCB_n. The delinking operation may further include updating the BACK_CP field of TCB_n with the same value in the BACK_CP field of TCB_o. The delinking operation may also include updating the FWD_CP field of TCB_n with the same value of FWD_CP field of TCB_o and updating the BACK_CP field of the TCB referred to by FWD_CP of TCB_n with the memory address of the TCB_n. In some embodiments, the API may also free the memory used for storing TCB_o and return the memory to the pool of free memory blocks. Finally, the API may include returning, at 535, a status indicator that TCB_o has been replaced by TCB_n, and operation of the hardware accelerator may resume. For example, an indicator may be sent to another logic or processing element of the hardware accelerator, or to the processor, indicating that the replacement is complete, and then the hardware accelerator may resume processing of TCBs in the linked list of TCBs. The return and resume function of element 535 may be similar to, for example, the return and resume function of element 440.

Figure 6:
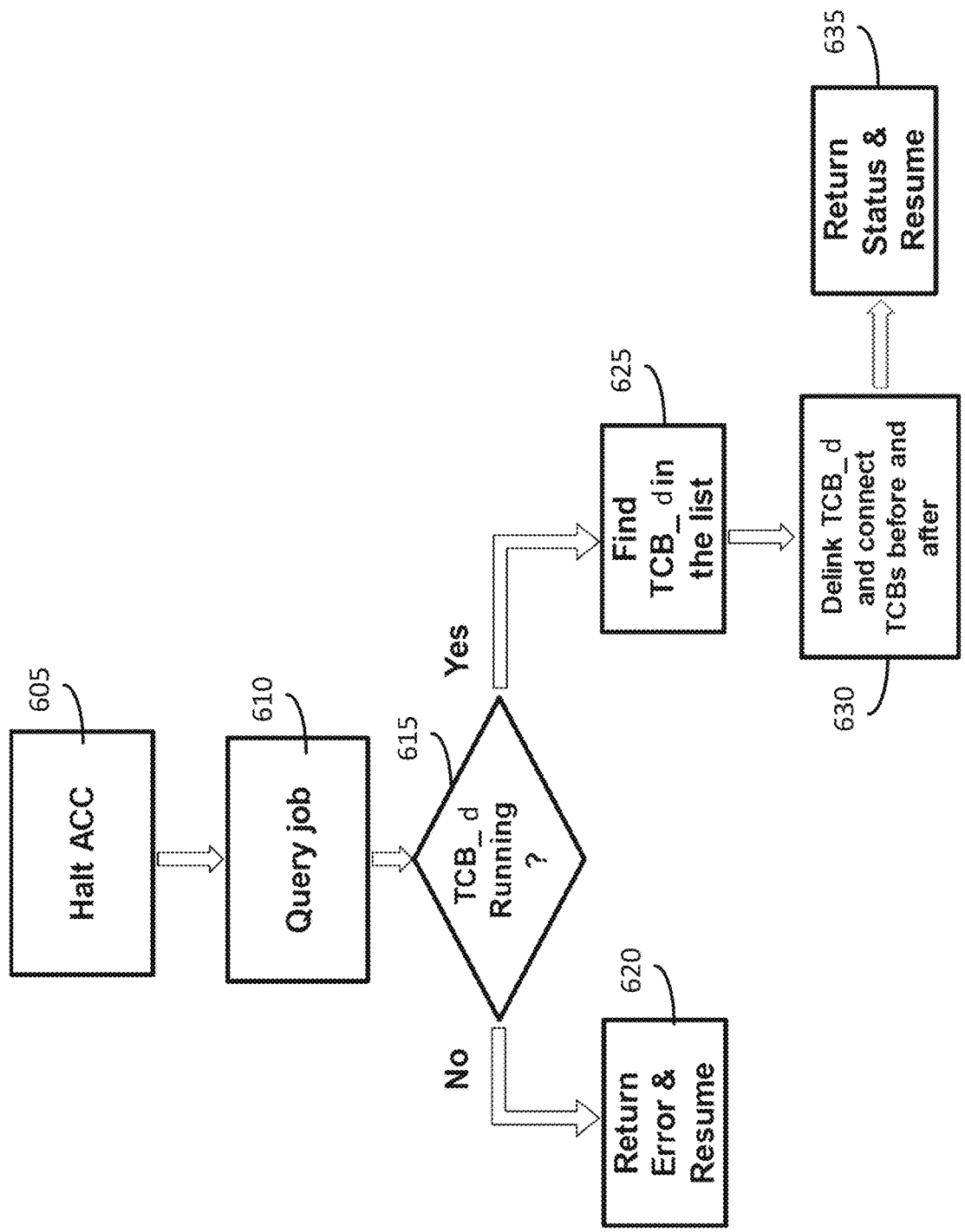
FIG. 6 depicts another example API which may be used to perform TCB job queueing, in accordance with various embodiments.

In some embodiments, it may be desirable to remove, rather than replace, a TCB in the linked list of TCBs. FIG. 6 depicts an API that may be used by a component of an electronic device such as the processor 210 to remove a TCB from the list of TCBs that are to be executed 220. The syntax of the API may be: delete_job (ACC_TCB TCB_d) wherein TCB_d may be a TCB that is to be discarded, and "ACC_TCB TCB_d" may include information that refers to TCB_d.

The API in FIG. 6 may include one or more elements which may be similar to, and share one or more characteristics with elements of FIG. 5. Specifically, elements 605, 610, 615, 620, 625, and 635 may be respectively similar to, and share one or more characteristics with, elements 505, 510, 515, 520, 525, and 535 of FIG. 5. Details of those elements will not be re-iterated for the sake of avoidance of redundancy.

However, as be seen, after TCB_d is found in the list of TCBs that are to be executed 220, the API of FIG. 6 may include delinking TCB_d at 630, and connecting the TCBs in the list that were before and after TCB_d. Specifically, the FWD_CP field of the TCB that precedes TCB_d may be altered to point to the TCB that follows TCB_d. Similarly, the BACK_CP field of the TCB that follows TCB_d may be altered to point to the TCB that precedes TCB_d. In this way, TCB_d may be effectively removed from the list of TCBs that are to be executed at 220. In some embodiments, the API may also free the memory used for storing TCB_d and return the memory to the pool of free memory blocks.

Figure 7:
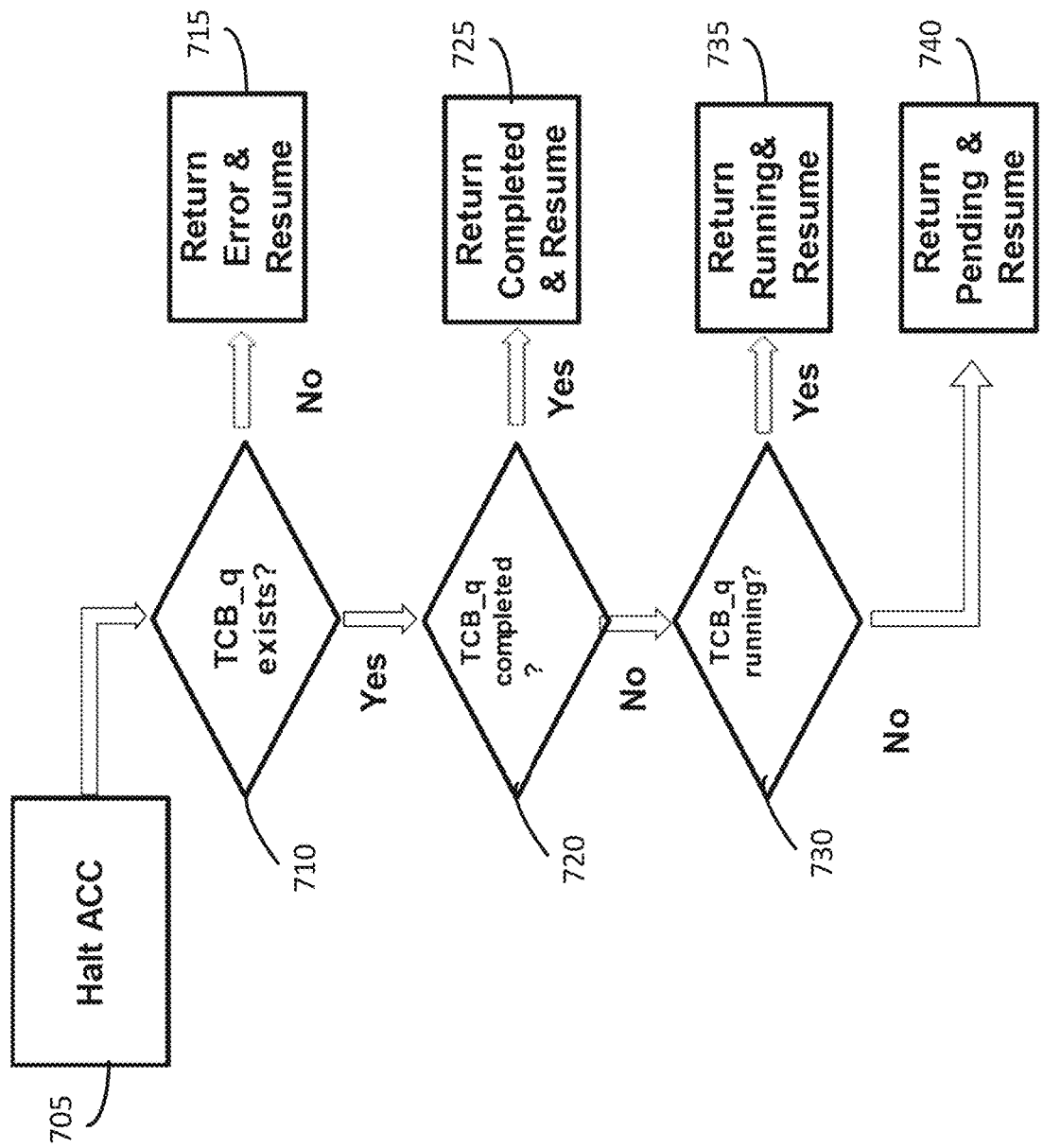
FIG. 7 depicts another example API which may be used to perform TCB job queueing, in accordance with various embodiments.

As noted, in some embodiments it may be desirable to query the status of a TCB in the linked list of TCBs. For example, the application code running on the processor 210 may request a status update on a particular TCB or a particular job from the hardware accelerator. As another example, the APIs of FIG. 5 or 6 may issue a query at elements 510 or 610. FIG. 7 depicts an example API which may be used in response to such a query. The API of FIG. 7 may be performed by the processor 210. The syntax of the query may be, for example, query_job(ACC_TCB TCB_q). "ACC_TCB TCB_q" may include information such as a pointer, and address, etc. that refers to a TCB ("TCB_q").

It will be noted that in some embodiments the APIs of one or more of FIGS. 3-6 may affect the last TCB in a given priority level. For example, a new TCB with a "high" priority may be inserted after the existing last TCB with a "high" priority. Alternatively, the last TCB with a given priority may be replaced or removed. In this situation, various updates to the various chain pointers, linked list of TCBs, etc. may be performed to accurately reflect the updated "last TCB" of that priority level.

The API may include halting, at 705, the hardware accelerator. Halting the hardware accelerator may be similar to the halt described with respect to elements 320, 505, 605, etc. The API may then include identifying, at 710, whether TCB_q exists. In other words, the API may identify whether TCB_q can be located in the linked list of TCBs. If TCB_q is found to not exist at 710, then the API may include returning an error at 715 and resuming operation which may be similar to, for example, element 440 above.

If TCB_q is identified at 710, the API may then include identifying, at 720, whether TCB_q is completed. In other words, the API may include identifying whether TCB_q is in the previously-executed TCBs 214. Additionally or alternatively, identifying whether TCB_q is completed may include checking a completion-flag that is related to, or part of, TCB_q. Other embodiments may include other indicators related to completion of the TCB. If so, then the API may include returning, at 725, an indication that TCB_q is completed and resuming operation as described above with respect to, for example, element 440.

If TCB_q is identified at 720 as having not been completed, then the API may include identifying, at 730, whether TCB_q is running. As used herein, "running" may indicate whether the TCB was in the active state of being processed or the job to which the TCB refers being executed by the hardware accelerator before the hardware accelerator was halted. If the TCB_q is identified at 730 as running, then the API may include returning an indication that the TCB_q is running at 735 and resume operation as described above with respect to, for example, element 440. However, if the TCB_q is not identified at 730 as running, then the API may include returning an indication that the TCB_q is pending at 740 as resume operation as described above with respect to, for example, element 440.

It will be understood that the above-described APIs are intended as examples of one embodiment, and other embodiments may vary from those described. For example, other embodiments may have more or fewer elements, different syntax, etc. In some embodiments, certain of the elements may be performed in a different order than that depicted in FIGS. 3-7. Additionally, although certain of the APIs, or elements thereof, may be described as performed by the hardware accelerator or the processor, in some embodiments one or more of the APIs, or elements thereof, that are described as being performed by the hardware accelerator may be performed by the processor, or vice-versa. Other variations may be present in other embodiments.

Figure 8:
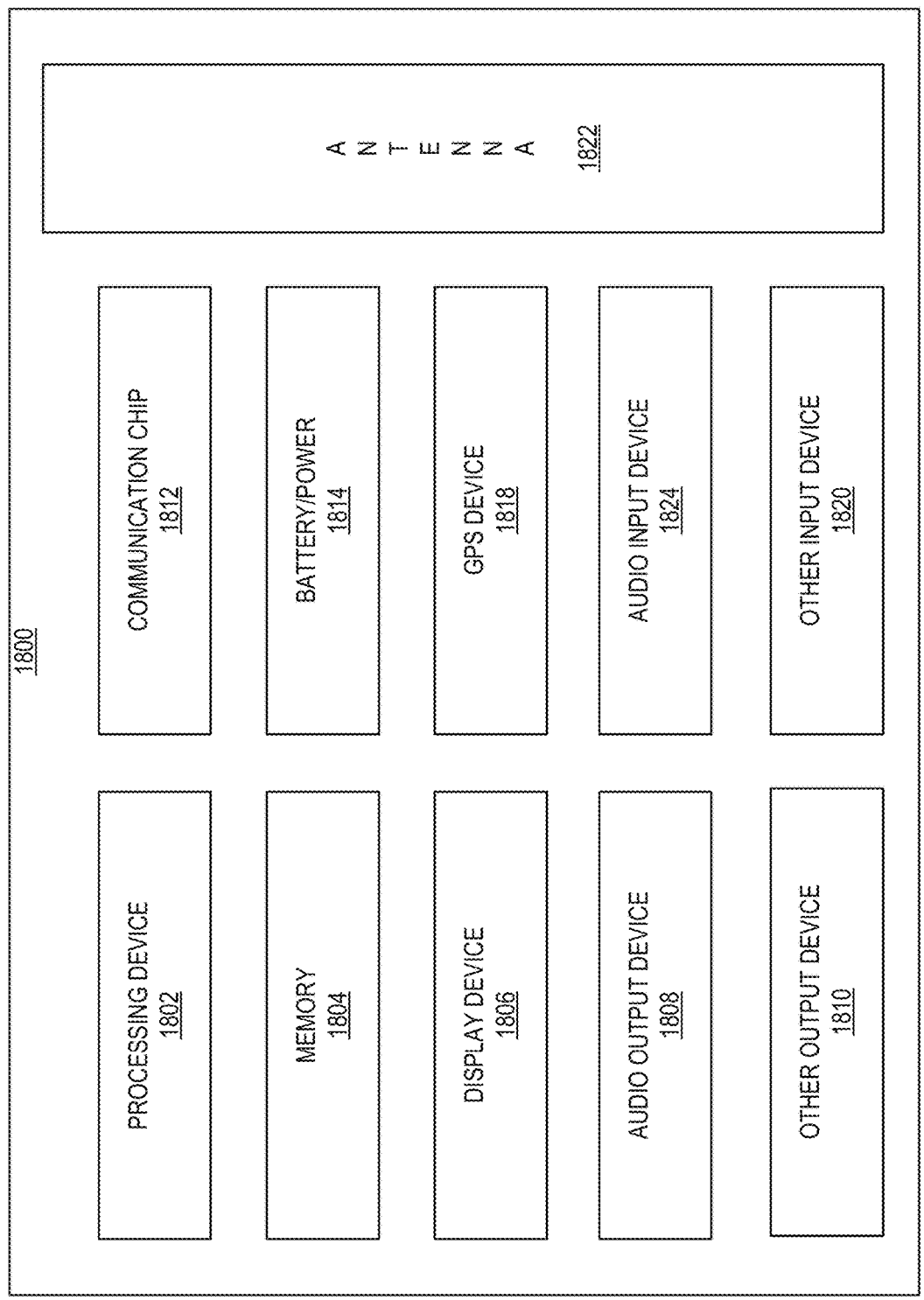
FIG. 8 is a block diagram of an example electrical device that may include a hardware accelerator and processor that is configured to perform TCB job queueing, in accordance with various embodiments.

FIG. 8 is a block diagram of an example electrical device 1800 that may include one or more hardware accelerators, in accordance with any of the embodiments disclosed herein. A number of components are illustrated in FIG. 8 as included in the electrical device 1800, but any one or more of these components may be omitted or duplicated, as suitable for the application. In some embodiments, some or all of the components included in the electrical device 1800 may be attached to one or more motherboards. In some embodiments, some or all of these components are fabricated onto a single SoC die.

Additionally, in various embodiments, the electrical device 1800 may not include one or more of the components illustrated in FIG. 8, but the electrical device 1800 may include interface circuitry for coupling to the one or more components. For example, the electrical device 1800 may not include a display device 1806, but may include display device interface circuitry (e.g., a connector and driver circuitry) to which a display device 1806 may be coupled. In another set of examples, the electrical device 1800 may not include an audio input device 1824 or an audio output device 1808, but may include audio input or output device interface circuitry (e.g., connectors and supporting circuitry) to which an audio input device 1824 or audio output device 1808 may be coupled.

The electrical device 1800 may include a processing device 1802 (e.g., one or more processing devices). As used herein, the term "processing device" or "processor" may refer to any device or portion of a device that processes electronic data from registers and/or memory to transform that electronic data into other electronic data that may be stored in registers and/or memory. The processing device 1802 may include one or more DSPs, ASICs, CPUs, graphics processing units (GPUs), cryptoprocessors (specialized processors that execute cryptographic algorithms within hardware), server processors, or any other suitable processing devices. The electrical device 1800 may include a memory 1804, which may itself include one or more memory devices such as volatile memory (e.g., dynamic random-access memory (DRAM)), nonvolatile memory (e.g., read-only memory (ROM)), flash memory, solid state memory, and/or a hard drive. In some embodiments, the memory 1804 may include memory that shares a die with the processing device 1802. This memory may be used as cache memory and may include embedded dynamic random-access memory (eDRAM) or spin transfer torque magnetic random-access memory (STT-MRAM). The processing device 1802 may be similar to, for example, processor 210, and may be coupled with a hardware accelerator such as hardware accelerator 205.

In some embodiments, the electrical device 1800 may include a communication chip 1812 (e.g., one or more communication chips). For example, the communication chip 1812 may be configured for managing wireless communications for the transfer of data to and from the electrical device 1800. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 1812 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 1812 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 1812 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 1812 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1812 may operate in accordance with other wireless protocols in other embodiments. The electrical device 1800 may include an antenna 1822 to facilitate wireless communications and/or to receive other wireless communications (such as AM or FM radio transmissions).

In some embodiments, the communication chip 1812 may manage wired communications, such as electrical, optical, or any other suitable communication protocols (e.g., the Ethernet). As noted above, the communication chip 1812 may include multiple communication chips. For instance, a first communication chip 1812 may be dedicated to shorter-range wireless communications such as Wi-Fi or Bluetooth, and a second communication chip 1812 may be dedicated to longer-range wireless communications such as global positioning system (GPS), EDGE, GPRS, CDMA, WiMAX, LTE, EV-DO, or others. In some embodiments, a first communication chip 1812 may be dedicated to wireless communications, and a second communication chip 1812 may be dedicated to wired communications.

The electrical device 1800 may include battery/power circuitry 1814. The battery/power circuitry 1814 may include one or more energy storage devices (e.g., batteries or capacitors) and/or circuitry for coupling components of the electrical device 1800 to an energy source separate from the electrical device 1800 (e.g., AC line power).

The electrical device 1800 may include a display device 1806 (or corresponding interface circuitry, as discussed above). The display device 1806 may include any visual indicators, such as a heads-up display, a computer monitor, a projector, a touchscreen display, a liquid crystal display (LCD), a light-emitting diode display, or a flat panel display.

The electrical device 1800 may include an audio output device 1808 (or corresponding interface circuitry, as discussed above). The audio output device 1808 may include any device that generates an audible indicator, such as speakers, headsets, or earbuds.

The electrical device 1800 may include an audio input device 1824 (or corresponding interface circuitry, as discussed above). The audio input device 1824 may include any device that generates a signal representative of a sound, such as microphones, microphone arrays, or digital instruments (e.g., instruments having a musical instrument digital interface (MIDI) output).

The electrical device 1800 may include a GPS device 1818 (or corresponding interface circuitry, as discussed above). The GPS device 1818 may be in communication with a satellite-based system and may receive a location of the electrical device 1800, as known in the art.

The electrical device 1800 may include another output device 1810 (or corresponding interface circuitry, as discussed above). Examples of the other output device 1810 may include an audio codec, a video codec, a printer, a wired or wireless transmitter for providing information to other devices, or an additional storage device.

The electrical device 1800 may include another input device 1820 (or corresponding interface circuitry, as discussed above). Examples of the other input device 1820 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The electrical device 1800 may have any desired form factor, such as a handheld or mobile electrical device (e.g., a cell phone, a smart phone, a mobile internet device, a music player, a tablet computer, a laptop computer, a netbook computer, an ultrabook computer, a personal digital assistant (PDA), an ultra mobile personal computer, etc.), a desktop electrical device, a server device or other networked computing component, a printer, a scanner, a monitor, a set-top box, an entertainment control unit, a vehicle control unit, a digital camera, a digital video recorder, or a wearable electrical device. In some embodiments, the electrical device 1800 may be any other electronic device that processes data.

EXAMPLES OF VARIOUS EMBODIMENTS

Example 1 includes a method comprising: identifying, by a component of a computing device, a TCB related to a job to be performed by the component; identifying, based on the TCB, a priority level of the job; inserting the job into a queue of jobs to be performed based on the identified priority level; and performing, based on the identified priority level, the job.

Example 2 includes the method of example 1, or some other example herein, wherein the component is a core or a hardware accelerator of the computing device.

Example 3 includes the method of example 1, or some other example herein, wherein the job is a job related to a DMA request.

Example 4 includes the method of any of examples 1-3, or some other example herein, wherein the job is a job with a higher priority level, and inserting the job with the higher priority level into the queue includes inserting the job with the higher priority level into the queue to be executed prior to the execution of a job with a lower priority level.

Example 5 includes the method of example 4, or some other example herein, wherein the job with the lower priority level was identified by the component of the computing device prior to the identification of the TCB.

Example 6 includes the method of example 4, or some other example herein, wherein the job with the lower priority level was inserted into the queue prior to the insertion of the job with the higher priority level.

Example 7 includes the method of any of examples 1-3, or some other example herein, wherein inserting the job into the queue of jobs to be performed is based on performance of an API related to the jobs.

Example 8 includes the method of any of examples 1-3, or some other example herein, wherein the queue of jobs to be performed includes a queue with four priority levels.

Example 9 includes one or more non-transitory computer-readable media comprising instructions that, upon execution of the instructions by one or more elements of a computing device, are to cause a component of the computing device to: identify a TCB related to a job to be performed by the component; identify, based on the TCB, a priority level of the job; insert the job into a queue of jobs to be performed based on the identified priority level; and perform, based on the identified priority level, the job.

Example 10 includes the one or more non-transitory computer-readable media of example 9, or some other example herein, wherein the component is a core or a hardware accelerator of the computing device.

Example 11 includes the one or more non-transitory computer-readable media of example 9, or some other example herein, wherein the job is a job related to a DMA request.

Example 12 includes the one or more non-transitory computer-readable media of any of examples 9-11, or some other example herein, wherein the job is a job with a higher priority level, and inserting the job with the higher priority level into the queue includes inserting the job with the higher priority level into the queue to be executed prior to the execution of a job with a lower priority level.

Example 13 includes the one or more non-transitory computer-readable media of example 12, or some other example herein, wherein the job with the lower priority level was identified by the component of the computing device prior to the identification of the TCB.

Example 14 includes the one or more non-transitory computer-readable media of example 12, or some other example herein, wherein the job with the lower priority level was inserted into the queue prior to the insertion of the job with the higher priority level.

Example 15 includes the one or more non-transitory computer-readable media of any of examples 9-11, or some other example herein, wherein inserting the job into the queue of jobs to be performed is based on performance of an API related to the jobs.

Example 16 includes the one or more non-transitory computer-readable media of any of examples 9-11, or some other example herein, wherein the queue of jobs to be performed includes a queue with four priority levels.

Example 17 includes an apparatus comprising: means to identify a TCB related to a job to be performed by the component; means to identify, based on the TCB, a priority level of the job; means to insert the job into a queue of jobs to be performed based on the identified priority level; and means to perform, based on the identified priority level, the job.

Example 18 includes the apparatus of example 17, or some other example herein, wherein the component is a core or a hardware accelerator of the computing device.

Example 19 includes the apparatus of example 17, or some other example herein, wherein the job is a job related to a DMA request.

Example 20 includes the apparatus of any of examples 17-19, or some other example herein, wherein the job is a job with a higher priority level, and means to insert the job with the higher priority level into the queue include means to insert the job with the higher priority level into the queue to be executed prior to the execution of a job with a lower priority level.

Example 21 includes the apparatus of example 20, or some other example herein, wherein the job with the lower priority level was identified by the component of the computing device prior to the identification of the TCB.

Example 22 includes the apparatus of example 20, or some other example herein, wherein the job with the lower priority level was inserted into the queue prior to the insertion of the job with the higher priority level.

Example 23 includes the apparatus of any of examples 17-19, or some other example herein, wherein inserting the job into the queue of jobs to be performed is based on performance of an API related to the jobs.

Example 24 includes the apparatus of any of examples 17-19, or some other example herein, wherein the queue of jobs to be performed includes a queue with four priority levels.

Example 25 includes an apparatus comprising: a memory; and a component communicatively coupled with the memory, wherein the component is to: identify a TCB related to a job to be performed by the component; identify, based on the TCB, a priority level of the job; insert the job into a queue of jobs to be performed based on the identified priority level; and perform, based on the identified priority level, the job.

Example 26 includes the apparatus of example 25, or some other example herein, wherein the component is a core or a hardware accelerator of the computing device.

Example 27 includes the apparatus of example 25, or some other example herein, wherein the job is a job related to a DMA request.

Example 28 includes the apparatus of any of examples 25-27, or some other example herein, wherein the job is a job with a higher priority level, and inserting the job with the higher priority level into the queue includes inserting the job with the higher priority level into the queue to be executed prior to the execution of a job with a lower priority level.

Example 29 includes the apparatus of example 28, or some other example herein, wherein the job with the lower priority level was identified by the component of the computing device prior to the identification of the TCB.

Example 30 includes the apparatus of example 28, or some other example herein, wherein the job with the lower priority level was inserted into the queue prior to the insertion of the job with the higher priority level.

Example 31 includes the apparatus of any of examples 25-27, or some other example herein, wherein inserting the job into the queue of jobs to be performed is based on performance of an API related to the jobs.

Example 32 includes the apparatus of any of examples 25-27, or some other example herein, wherein the queue of jobs to be performed includes a queue with four priority levels.

Example 33 includes a computing device comprising: a processor to: identify, in a TCB, an indication of a priority level of the TCB; identify, based on the indication of the priority level, a location in a queue of a plurality of TCBs; and insert the TCB in the queue at the identified location; and a hardware accelerator communicatively coupled with the processor, wherein the hardware accelerator is to perform jobs related to TCBs in the queue of the plurality of TCBs, wherein the hardware accelerator is to perform a job related to a TCB in accordance with an order of the TCB in the queue of the plurality of TCBs.

Example 34 includes the computing device of example 33, or some other example herein, wherein the indication of the priority level is a 2-bit indicator in the TCB.

Example 35 includes the computing device of example 33, or some other example herein, wherein the processor is further to transmit a halt-request prior to transmission of the TCB.

Example 36 includes the computing device of any of examples 33-35, or some other example herein, wherein the queue includes a first sub-portion of TCBs at a first priority level and a second sub-portion of TCBs at a second priority level that is lower than the first priority level, and wherein the hardware accelerator is to perform jobs related to the first sub-portion of TCBs before the hardware accelerator performs jobs related to the second sub-portion of TCBs.

Example 37 includes the computing device of example 36, or some other example herein, wherein the TCB is at the first priority level and wherein the processor is further to: identify a priority level of a currently-executing TCB; and identify the location in the queue based on the priority level of the currently-executing TCB.

Example 38 includes the computing device of example 37, or some other example herein, wherein the priority level of the currently-executing TCB is the first priority level, and wherein the location is at the end of the first sub-portion of the TCBs.

Example 39 includes the computing device of example 37, or some other example herein, wherein the priority level of the currently-executing TCB is the second priority level, and wherein the location is after the currently-executing TCB and prior to other TCBs of the second sub-portion of TCBs.

Example 40 includes a processor comprising: a communications interface to communicate with a hardware accelerator; and logic coupled with the communications interface, wherein the logic is to: identify, in a TCB, an indication of a priority level of the TCB; and insert, based on the indication of the priority level, the TCB at a location in a queue of a plurality of TCBs; wherein the hardware accelerator is to execute respective ones of the plurality of TCBs based on their location within the queue.

Example 41 includes the processor of example 40, or some other example herein, wherein the indication of the priority level is a 2-bit indicator in the TCB.

Example 42 includes the processor of example 40, or some other example herein, wherein the indication of the priority level indicates that the TCB is at one of a plurality of possible priority levels.

Example 43 includes the processor of any of examples 40-42, or some other example herein, wherein the TCB further includes an indication that the hardware accelerator is to wait to receive a trigger from the processor prior to processing the TCB, an indication that the hardware accelerator is to send an interrupt to the processor related to completion of the TCB, or an indication that the hardware accelerator is to send a trigger to the processor related to completion of the TCB.

Example 44 includes the processor of any of examples 40-42, or some other example herein, wherein the TCB further includes an indication of a type of computation that is to be used to perform a job related to the TCB.

Example 45 includes the processor of any of examples 40-42, or some other example herein, wherein the TCB further includes an indication of a previous TCB in the queue of the plurality of TCBs.

Example 46 includes one or more non-transitory computer-readable media comprising instructions that, when executed by an electronic device, are to cause a processor of the electronic device to: identify a queue of a plurality of TCBs, wherein respective TCBs of the plurality of TCBs include an indication of a priority level of the respective TCBs within the queue, and a hardware accelerator is to perform a job related to a respective TCB in accordance with the priority level of the TCB; execute an application programming interface (API) related to the queue; and modify the queue based on execution of the API.

Example 47 includes the one or more non-transitory computer-readable media of example 46, or some other example herein, wherein the API is related to the insertion of a TCB into the queue of the plurality of TCBs based on an indication of a priority level of the TCB.

Example 48 includes the one or more non-transitory computer-readable media of example 47, or some other example herein, wherein the insertion of the TCB is related to a flag that indicates a last TCB at a priority level.

Example 49 includes the one or more non-transitory computer-readable media of example 46, or some other example herein, wherein the API is related to deletion of a TCB from the queue.

Example 50 includes the one or more non-transitory computer-readable media of example 46, or some other example herein, wherein the API is related to modification of a TCB of the queue.

Example 51 includes the one or more non-transitory computer-readable media of example 46, or some other example herein, wherein the API is related to identification of an execution status of a TCB within the queue.

Example 52 includes the one or more non-transitory computer-readable media of example 46, wherein the API is related to a reset of the hardware accelerator.

Example 53 includes a method of performing the subject matter of any of examples 1-52, or some subset or combination thereof.

Example 56 includes one or more non-transitory computer-readable media comprising instructions that, upon execution of the instructions by one or more elements of a computing device, are to cause a component of the computing device to perform the subject matter of any of examples 1-52, or some subset or combination thereof.

Example 55 includes an apparatus that includes circuitry to perform or cause to perform the subject matter of any of examples 1-52, or some subset or combination thereof.

Examples 56 includes an apparatus comprising means to perform or cause to perform the subject matter of any of examples 1-52, or some subset or combination thereof.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments, including what is described in the Abstract, is not intended to be exhaustive or limiting as to the precise forms disclosed. While specific implementations of, and examples for, various embodiments or concepts are described herein for illustrative purposes, various equivalent modifications may be possible, as those skilled in the relevant art will recognize. These modifications may be made in light of the above detailed description, the Abstract, the Figures, or the claims.

The invention claimed is:

1. A computing device comprising:
a processor to:
identify, in a task control block (TCB), an indication of a priority level of the TCB;
identify, based on the indication of the priority level, a location in a queue of a plurality of TCBs, wherein each TCB in the queue of the plurality of TCBs is assigned specifically to a hardware accelerator for performance of a job related to the respective TCB; and
insert the TCB in the queue at the identified location, wherein the inserted TCB further includes an indication of a job completion signaling mechanism for the hardware accelerator to signal the processor at completion of a respective job associated with the inserted TCB; and
the hardware accelerator communicatively coupled with the processor, wherein the hardware accelerator performs jobs related to TCBs in the queue of the plurality of TCBs, wherein the hardware accelerator performs a job related to a TCB in accordance with an order of the TCB in the queue of the plurality of TCBs.

2. The computing device of claim 1, wherein the indication of the priority level is a 2-bit indicator in the TCB.

3. The computing device of claim 1, wherein the processor is further to transmit a halt-request prior to transmission of the TCB.

4. The computing device of claim 1, wherein the queue includes a first sub-portion of TCBs at a first priority level and a second sub-portion of TCBs at a second priority level that is lower than the first priority level, and wherein the hardware accelerator is to perform jobs related to the first sub-portion of TCBs before the hardware accelerator performs jobs related to the second sub-portion of TCBs.

5. The computing device of claim 4, wherein the TCB is at the first priority level and wherein the processor is further to:
identify a priority level of a currently-executing TCB; and
identify the location in the queue based on the priority level of the currently-executing TCB.

6. The computing device of claim 5, wherein the priority level of the currently-executing TCB is the first priority level, and wherein the location is at the end of the first sub-portion of the TCBs.

7. The computing device of claim 5, wherein the priority level of the currently-executing TCB is the second priority level, and wherein the location is after the currently-executing TCB and prior to other TCBs of the second sub-portion of TCBs.

8. A processor comprising:
a communications interface to communicate with a hardware accelerator; and
logic coupled with the communications interface, wherein the logic is to:
identify, in a task control block (TCB), an indication of a priority level of the TCB; and
insert, based on the indication of the priority level, the TCB at a location in a queue of a plurality of TCBs;
wherein the hardware accelerator is to execute respective ones of the plurality of TCBs based on their location within the queue, and
wherein the inserted TCB further includes an indication of a job completion signaling mechanism for the hardware accelerator to signal the processor at completion of a respective job associated with the inserted TCB.

9. The processor of claim 8, wherein the indication of the priority level is a 2-bit indicator in the TCB, and wherein the indication of the priority level indicates that the TCB is at one of a plurality of priority levels.

10. The processor of claim 8, wherein the inserted TCB includes the indication of the job completion signaling mechanism including:
a first indication indicating whether the hardware accelerator is to send an interrupt to the processor related to the completion of the inserted TCB; and
a second indication indicating whether the hardware accelerator is to send a trigger to the processor related to the completion of the inserted TCB.

11. The processor of claim 8, wherein the TCB further includes an indication of a type of computation that is to be used to perform a job related to the TCB.

12. The processor of claim 8, wherein the TCB further includes an indication of a previous TCB in the queue of the plurality of TCBs.

13. One or more non-transitory computer-readable media comprising instructions that, when executed by an electronic device, are to cause a processor of the electronic device to:
identify a queue of a plurality of task control blocks (TCBs), wherein respective TCBs of the plurality of TCBs include an indication of a priority level of the respective TCBs within the queue, and a hardware accelerator is to perform a job related to a respective TCB in accordance with the priority level of the TCB, and wherein at least a first TCB of the plurality of TCBs further includes an indicating of a job completion signaling mechanism for the hardware accelerator to signal the processor at completion of a respective job associated with the first TCB;
execute an application programming interface (API) related to the queue; and
modify the queue based on execution of the API.

14. The one or more non-transitory computer-readable media of claim 13, wherein the API is related to an insertion of a TCB into the queue of the plurality of TCBs based on an indication of a priority level of the TCB.

15. The one or more non-transitory computer-readable media of claim 14, wherein an insertion of the TCB is related to a flag that indicates a last TCB at a priority level.

16. The one or more non-transitory computer-readable media of claim 13, wherein the API is related to deletion of a TCB from the queue.

17. The one or more non-transitory computer-readable media of claim 13, wherein the API is related to modification of a TCB of the queue.

18. The one or more non-transitory computer-readable media of claim 13, wherein the API is related to identification of an execution status of a TCB within the queue.

19. The one or more non-transitory computer-readable media of claim 13, wherein the API is related to a reset of the hardware accelerator.

20. The processor of claim 8, wherein the TCB further includes an indication that the hardware accelerator is to wait to receive a trigger from the processor prior to processing the TCB.

\* \* \* \* \*